H. J. HERT.
STEERING APPARATUS.
APPLICATION FILED MAR. 24, 1910.
981,420.
Patented Jan. 10, 1911.
2 SHEETS—SHEET 2.
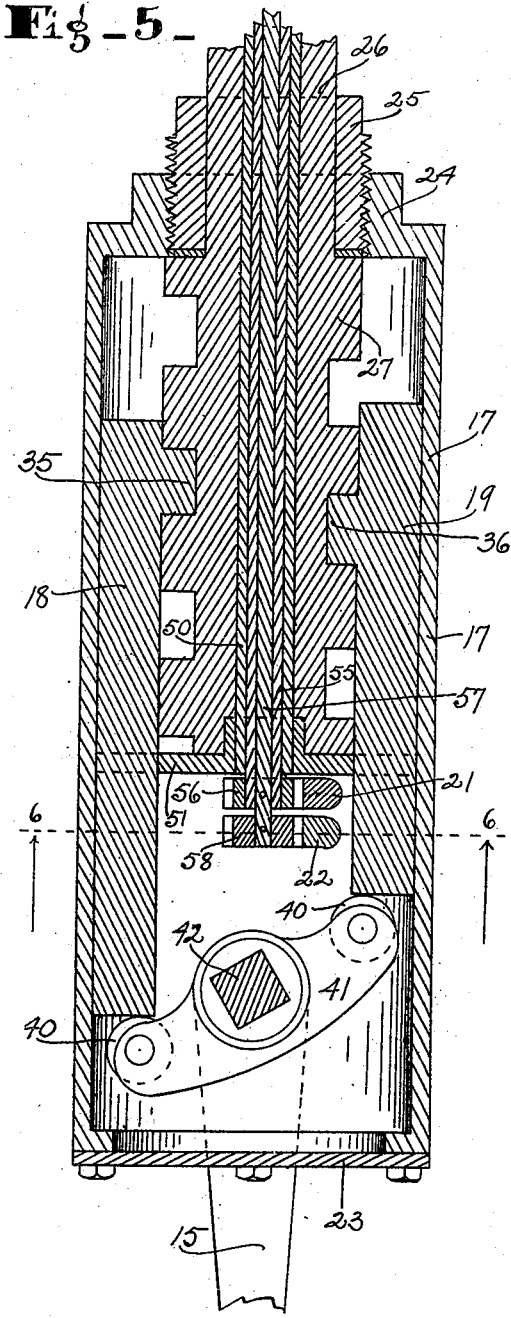
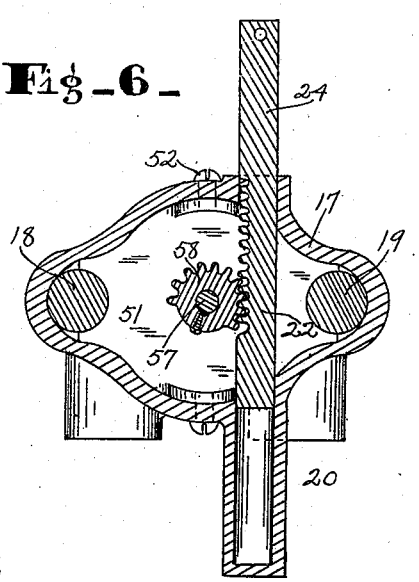
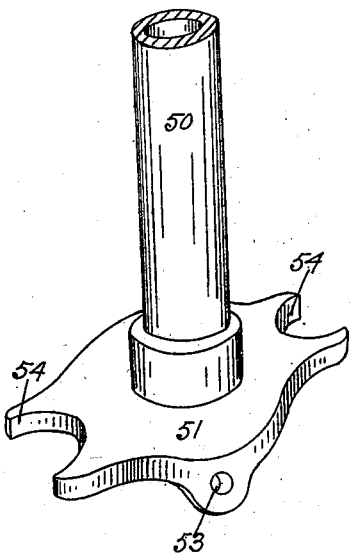
WITNESSES:
W. M. Gentle.
O. M. McLaughlin
INVENTOR.
Henry J. Hert.
BY
W. H. Lockwood
ATTORNEY.

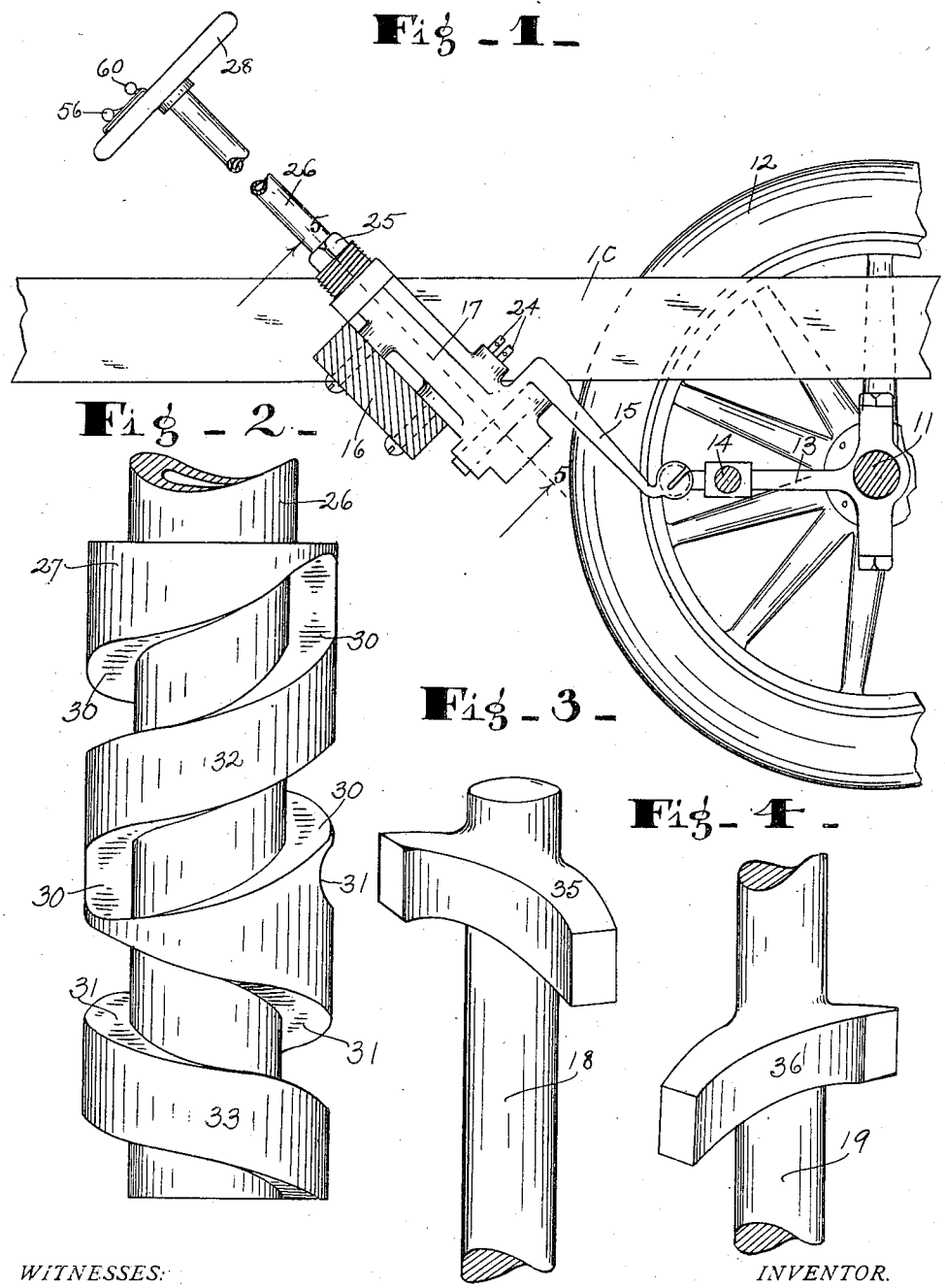

UNITED STATES PATENT OFFICE.

HENRY J. HERT, OF INDIANAPOLIS, INDIANA.

STEERING APPARATUS.

981,420.  Specification of Letters Patent.  Patented Jan. 10, 1911.

Application filed March 24, 1910. Serial No. 551,364.

*To all whom it may concern:*

Be it known that I, HENRY J. HERT, of Indianapolis, county of Marion, and State of Indiana, have invented a certain new and useful Steering Apparatus; and I do hereby declare that the following is a full, clear, and exact description thereof, reference being had to the accompanying drawings.

The object of this invention is to improve the construction of steering apparatus for automobiles and the like set forth in my former application for Letters Patent, Serial No. 517,995, filed Sept. 16, 1909.

The chief feature of this invention is in the relative location of the cam grooves in the head of the steering tube. They are right and left grooves and the lower end of the upper groove is diametrically opposite the upper end of the lower groove. This materially increases the compactness of the device and shortness of the head of the steering tube.

Another feature of the invention consists in providing a stationary housing tube within the steering tube for the rods or tubes which carry the levers for controlling the throttle and ignition and securing a guide plate at the lower end of said tube and within the casing surrounding the head on the steering tube and above the rocking shaft for holding said housing tube and also for guiding the push rods which actuate the steering mechanism. This materially strengthens the structure and coöperates with the casing in guiding said push rods.

The nature of the invention will be understood from the accompanying drawings and the following description and claims.

In the drawings Figure 1 is a central vertical section through the forward part of the chassis of an automobile, with parts broken away, to show the location of the steering apparatus. Fig. 2 is a side elevation of the lower end of the steering tube with the cam grooved head thereon. Figs. 3 and 4 are elevations of the push rods with cam flanges, the rods being partially broken away. Fig. 5 is a central vertical section through the device on the line 5—5 of Fig. 1. Fig. 6 is a cross section on the line 6—6 of Fig. 5. Fig. 7 is a perspective view of the lower end of the housing tube and the guide plate.

The drawings herein show the frame 10, front axle 11 and front wheel 12 of an automobile, the wheel and frame being partly broken away. Arms 13 extend rearwardly from the axle and are connected with the horizontal rod 14 to which the steering arm 15 is pivotally connected.

There is a cross bar 16 secured to the frame and on which a casing 17 is mounted in an inclined position. This casing is tubular, as shown in Fig. 6, the opposite lateral sides being contracted in cross section to furnish guideways for the push rods 18 and 19. It also has an extension 20 from one side to serve as a guideway for one end of each of the rack bars 21 and 22, which extend transversely through the chamber within the casing 17 and one side of said casing, as shown in Fig. 6. The lower end of the casing 17 has a bottom plate 23 and the upper end is contracted at 24 and internally threaded to receive the nut 25 which surrounds the steering tube 26 which projects into said casing. The nut 25 holds the head 27 at the lower end of the steering tube down in place and the wear of the parts is taken up by tightening that nut. The steering wheel 28 is on the upper end of the steering tube.

The head 27 at the lower end of the steering tube may be secured to the steering tube in any way desired, but herein the same is integral and has right and left cam grooves 30 and 31 forming cam flanges 32 and 33, respectively. The lower end of the groove 30 is located diametrically opposite the upper end of the groove 31. The grooves as herein shown extend about the steering tube substantially one and one-half times, although this length of groove is not necessary because the cam flanges 35 and 36 on the push rods 18 and 19 are relatively short segments, say about twenty or thirty degrees. The cam flange 36 projects into the groove 31 and the flange 35 in the groove 30 and these flanges are relatively thick. The reduction of the length of the cam grooves 30 and 31, by reason of the shortness of the cam flanges 35 and 36, enables said cam grooves to have a very slight pitch and the flanges between the grooves of the head 27 of the steering tube to be relatively thick and strong. This slightness of pitch enables the device to be easily operated, as the steering tube is oscillated slightly to the right and to the left. Such oscillation of the steering tube in one direction forces one of the push rods down, and oscillation in the other direction forces the other push rod down.

The push rods bear at their lower ends upon rollers 40 in the ends of a rocking lever 41 secured on the shaft 42 mounted transversely in the lower part of the casing 17 and on the outer end of which the steering arm 15 is secured. The push rods 18 and 19 rock the lever 41 and thus actuate the steering arm.

Within the steering tube there is a stationary housing tube 50 that is secured at its lower end to the cross plate 51 which is secured to the casing on each side by screws 52 in the holes 53. This plate is at the lower end of the steering tube and in opposite ends has recesses 54 through which the push rods 18 and 19 extend and operate. These guide recesses in the plate 51 coöperate with the contracted side portions of the casing 17, as shown in Fig. 6, for holding the push rod.

Through the housing tube 50 the tube 55 extends which has a pinion 56 (herein shown mutilated) on its lower end just below the plate 51. Said pinion meshes with the rack bar 21. A rod 57 extends through the tube 55 and carries a pinion 58 (likewise mutilated) on its lower end just below the other pinion 56 and it meshes with the rack 22. Levers 59 and 60 on the steering wheel are secured in the upper ends of tube 55 and rod 57 for oscillating and actuating them. The rack bars 24 extend transversely from the casing 17 and are connected by any suitable means to the throttle valve of a carbureter and the ignition device in the automobile, but which are not herein shown.

What I claim as my invention and desire to secure by Letters Patent is:

1. Steering apparatus for automobiles and the like including a steering tube, a casing into which the lower end of the steering tube projects, right and left cam grooves on the lower end of the steering tube and within said casing, push rods in opposite sides of the casing, a cam flange on each push rod which projects into one of said grooves, a cross plate secured within said casing at the lower end of the steering tube through which said push rods extend and are guided, a rocking lever mounted in the casing in position to be actuated by said push rods, and means actuated by said lever for steering the wheels of the vehicle.

2. A steering apparatus for automobiles and the like including a steering tube, a casing into which the lower end of the steering tube projects and which is contracted at opposite sides to form a guideway for the hereinafter mentioned push rods, right and left cam grooves on the lower end of the steering tube within said casing, push rods in opposite sides of the casing, a cam flange on each push rod which projects into one of said grooves, a cross plate secured within said casing at the lower end of the steering tube conforming to the shape of the casing in cross section and with recesses in opposite ends thereof through which said push rods extend so as to coöperate with the casing and aid it in holding and guiding the push rods, a rocking lever mounted in the casing in position to be actuated by said push rods, and means actuated by said lever for steering the wheels of the vehicle.

3. A steering apparatus for automobiles and the like including a steering tube, a casing into which the lower end of the steering tube projects and which is contracted at opposite sides to form a guideway for the hereinafter mentioned push rods, right and left cam grooves on the lower end of the steering tube within said casing, push rods in opposite sides of the casing, a cam flange on each push rod which projects into one of said grooves, a cross plate secured within said casing at the lower end of the steering tube conforming to the shape of the casing in cross section and with recesses in opposite ends thereof through which said push rods extend so as to coöperate with the casing and aid it in holding and guiding the push rods, means extending through the steering tube and said plate and having bearing therein for controlling the throttle and ignition devices, a rocking lever mounted in the casing in position to be actuated by said push rods, and means actuated by said lever for steering the wheels of the vehicle.

In witness whereof, I have hereunto affixed my signature in the presence of the witnesses herein named.

HENRY J. HERT.

Witnesses:
G. H. BOINK,
H. TURNBELL.